(12) United States Patent  (10) Patent No.: US 8,511,360 B2
Misciagna et al.  (45) Date of Patent: Aug. 20, 2013

(54) COMPOSITE INTERSECTION REINFORCEMENT

(75) Inventors: David T. Misciagna, Hockessin, DE (US); Jessica J. Fuhrer, Ardmore, PA (US); Robert S. Funk, Morton, PA (US); William S. Tolotta, Broomall, PA (US)

(73) Assignee: The Boeing Company, Chicago, IL (US)

( * ) Notice: Subject to any disclaimer, the term of this patent is extended or adjusted under 35 U.S.C. 154(b) by 802 days.

(21) Appl. No.: 12/633,470

(22) Filed: Dec. 8, 2009

(65) Prior Publication Data

US 2010/0112327 A1    May 6, 2010

Related U.S. Application Data

(62) Division of application No. 11/460,085, filed on Jul. 26, 2006, now Pat. No. 7,686,908.

(51) Int. Cl.
   *B65H 81/00*    (2006.01)
(52) U.S. Cl.
   USPC .......................................... 156/425; 156/500
(58) Field of Classification Search
   USPC .................. 156/425, 433, 441, 500
   See application file for complete search history.

(56) References Cited

U.S. PATENT DOCUMENTS

| | | | |
|---|---|---|---|
| 4,137,354 A * | 1/1979 | Mayes et al. | 428/116 |
| 4,201,815 A | 5/1980 | Weiland et al. | |
| 4,460,531 A | 7/1984 | Harris et al. | |
| 4,584,226 A | 4/1986 | Vitale et al. | |
| 4,715,560 A | 12/1987 | Loyek | |
| 4,735,672 A | 4/1988 | Blad | |
| 5,216,799 A | 6/1993 | Charnock et al. | |
| 5,342,679 A | 8/1994 | Aochi et al. | |
| 5,356,692 A * | 10/1994 | Perez | 428/116 |
| 5,558,738 A | 9/1996 | Rector | |
| 6,050,315 A * | 4/2000 | Deckers et al. | 156/433 |
| 6,245,274 B1 | 6/2001 | Huybrechts et al. | |
| 2004/0232686 A1 | 11/2004 | Locke | |

* cited by examiner

*Primary Examiner* — Jeff Aftergut
(74) *Attorney, Agent, or Firm* — Yee & Associates, P.C.

(57) ABSTRACT

An assembly and method for manufacturing a composite reinforcement for unitizing a structure are provided. According to one embodiment, the assembly includes a base having a plurality of pins extending outwardly therefrom to define a structure about which a composite fiber is wound to define a composite reinforcement preform. The assembly also includes a plurality of mandrels positioned adjacent to the base and at least a portion of the composite reinforcement preform, and a cap that is positioned over at least a portion of the plurality of mandrels. The cap is configured to engage each of the mandrels to support the mandrels and the composite reinforcement preform during a curing process to form the composite reinforcement.

20 Claims, 6 Drawing Sheets

COMPOSITE INTERSECTION REINFORCEMENT

This application is a divisional of application Ser. No. 11/460,085, filed Jul. 26, 2006, now issued as U.S. Pat. No. 7,686,908.

FEDERALLY SPONSORED RESEARCH OR DEVELOPMENT

This invention was made with Government support under NCC2-9019 awarded by NASA. The Government has certain rights in this invention.

BACKGROUND OF THE INVENTION

1) Field of the Invention

Embodiments of the present invention relate to composite structures and, more particularly, to the intersection of composite reinforcements for integration with various structures.

2) Description of Related Art

Composite structures provide weight, fatigue strength, and corrosion resistance advantages over metallic structures. Unitization and new manufacturing processes have reduced the cost of composite structures and yielded additional weight savings. Applying composites to complex, highly loaded structures, however, has required multiple manufacturing operations and costly assembly processes. With respect to the aircraft industry, large, unitized, grid-stiffened structures have been developed by integrating axial and longitudinal stiffeners with the aircraft skin. But, there has been no efficient mechanism to transfer loads though the intersections of the stiffeners, which has required additional weight and complexity at the intersections.

In particular, utilization of a longitudinal stiffener and circumferential frame approach consists of large composite or metallic frames that are mechanically fastened at locations along the length of the fuselage and fastened circumferentially to the fuselage's composite skin. This design also includes longitudinal stiffeners that are co-cured, co-bonded, or mechanically fastened to the fuselage's composite skin. This design is not the optimum approach since the frames cannot transverse through the stiffeners. Therefore, the longitudinal stiffeners terminate before and after each frame, which reduces the ability of the structure to control buckling. As such, the load that each longitudinal stiffener carries is directed through the skins. To carry the extra loads the skin thickness must be increased along with the stiffener and frames which increases the weight and complexity of the structure. Furthermore, since the frames are mechanically fastened to the fuselage the fabrication cost is very high.

Composite structures lend themselves to be fabricated as a monolithic or unitized structure. In other words, it is generally less complex and costly to produce a composite fuselage that is co-cured with the skins, longitudinal stiffeners, and frames than it is to build up each component in smaller sections. There are generally three ways to reduce the cost of fabricating composite structures: minimize or eliminate tooling, mechanization of the lay-up process, and unitization of the structure. To minimize tooling costs multifunctional tools were developed. For example, tools have been developed that allow a user to lay-up, cure, and trim on a single tool eliminating the need for two additional tools. The mechanization of composite parts is accomplished through various processes such as: fiber placement, filament winding, braiding, and tape placement. The development of large unitized structures, such as grid-stiffened structural skins, reduces the cost of composite structures due to the elimination of lay-up and cure processes.

One limitation of these large, unitized grid-stiffened structures is that there is no efficient mechanism to transfer loads in both directions through the stiffeners. Current state of the art technology uses primarily braiding or woven intersections for composite intersection reinforcement. However, when braided and woven intersections are unfolded after fabrication, the intersections may have line length differences which typically lead to significant tow waviness through the intersection of the composite intersection reinforcement. Moreover, it is difficult to control the fiber distortion during curing of these composite fiber materials.

U.S. Pat. No. 4,584,226 to Vitale et al. discloses an alternative technique for transferring loads through a structure that includes laminated sheets and fiber strands formed into webs that intersect at a common junction and carry loads through the intersection. The '226 patent also discloses that a single fiber strand may be utilized in an interweaving tool to direct the strand in a repetitive path, such as a clover leaf or figure eight pattern, to obtain a cruciform load transfer structure. The tool generally includes a primary set of mandrels and shuttle carrier rings, where the rings are configured to rotate in a fixed orbit while the mandrels are shifted relative to the rings. Laminated sheets of carbon fiber cloth and tape are positioned to underlie or enclose the cruciform shaped strand. The structure is then cured in a heating chamber or autoclave in order to harden the structure.

Despite these advantages in developing unitized grid stiffened structures, there is a need for more efficiently manufacturing composite intersection reinforcements. In addition, there is a need for a composite intersection reinforcement that effectively transfers loads through the intersection of a plurality of structures.

It would therefore be advantageous to provide an apparatus and method for efficiently and effectively manufacturing composite reinforcements for integration with various structures. In addition, it would be advantageous to provide composite reinforcements that effectively transfer loads through the intersection of a plurality of structures.

BRIEF SUMMARY OF THE INVENTION

Embodiments of the invention may address at least some of the above needs and achieve other advantages by providing an apparatus and method for manufacturing composite reinforcements for unitizing a structure. Generally, embodiments of the present invention facilitate the integration of composite reinforcements (i.e., cruciforms) with structures such that both axial and transverse loading is capable of being transferred through the intersection of the reinforcements and structure. In particular, a continuous composite fiber may be wound in various configurations about a plurality of pins to achieve a desired strength and load carrying capacity for a variety of applications. For example, in the context of the aircraft industry, the composite reinforcements may be integrated with a frame and longitudinal stiffeners to form a unitized grid-stiffened structure.

According to one embodiment, the assembly includes a base having a plurality of pins extending outwardly therefrom to define a structure about which a composite fiber is wound to define a composite reinforcement preform. The assembly also includes a plurality of mandrels positioned adjacent to the base and at least a portion of the composite reinforcement preform, and a cap that is positioned over at least a portion of the plurality of mandrels. The cap is configured to engage each of the mandrels to support the mandrels and the composite reinforcement preform during a curing process to form the composite reinforcement.

According to various modifications of the assembly of the present invention, the base comprises four pins, and/or the pins are positioned such that the composite fiber is wound about the pins in a figure eight pattern. Each mandrel may include a frustum shape, and the mandrels could be positioned on the base to collectively define a prismatic shape. In addition, each mandrel may include a key or a keyway that is configured to mate with a respective keyway or key in the cap. Each mandrel may include a tapered surface extending along a backside of the mandrel, while the cap may also include a tapered surface that corresponds with each of the tapered surfaces on a respective mandrel. Moreover, the cap may be positioned over the pins and mandrels and adjacent to the base, or the cap may be positioned adjacent to a portion of the plurality of mandrels opposite the base.

An additional aspect of the present invention provides a method for manufacturing a composite reinforcement for unitizing a structure. The method includes winding a continuous composite fiber to define a composite reinforcement preform, and positioning a plurality of mandrels adjacent to at least a portion of the composite reinforcement preform. The method also includes positioning a cap over at least a portion of the mandrels to provide support thereto, and at least partially curing at least a portion of the composite reinforcement preform to form the composite reinforcement.

Aspects of the method include winding the composite fiber about the pins in a figure eight pattern. The positioning step may include slidably engaging the cap over each mandrel. The winding step may include winding a continuous filament of a pre-impregnated tow material or a dry tow material about the pins, and/or winding the continuous composite fiber about the pins such that the composite reinforcement includes at least one intersection. In addition, the method could further include indexing the continuous composite fiber during the winding step, and/or winding a plurality of layers of the continuous composite fiber. The curing step could include partially or completely curing the composite reinforcement preform, and the method may further include adjusting at least one of speed, tension, and temperature of winding the continuous composite fiber.

A further embodiment of the present invention provides a composite reinforcement for unitizing a structure. The composite reinforcement includes a plurality of legs formed of a continuous composite fiber and having at least one intersection, wherein the legs are comprised of a plurality of unidirectional layers positioned one on top of the other, and wherein at least a portion of at least one leg is configured to be secured to at least one structure. According to one aspect, the continuous composite fiber comprises a cruciform cross section.

An additional variation of the present invention provides a method for manufacturing a composite reinforcement for unitizing a structure. The method includes winding a continuous composite fiber to define a composite reinforcement preform, wherein at least a portion of the composite reinforcement preform includes a plurality of legs having at least one intersection and a plurality of unidirectional layers of composite fiber. The method also includes positioning a plurality of mandrels adjacent to at least a portion of the composite reinforcement preform, and at least partially curing (e.g., partially or completely) at least a portion of the composite reinforcement preform to form the composite reinforcement. One variation of the method includes indexing the continuous composite fiber during the winding step, and/or positioning a cap over at least a portion of the plurality of mandrels to provide support thereto.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Figure 1:
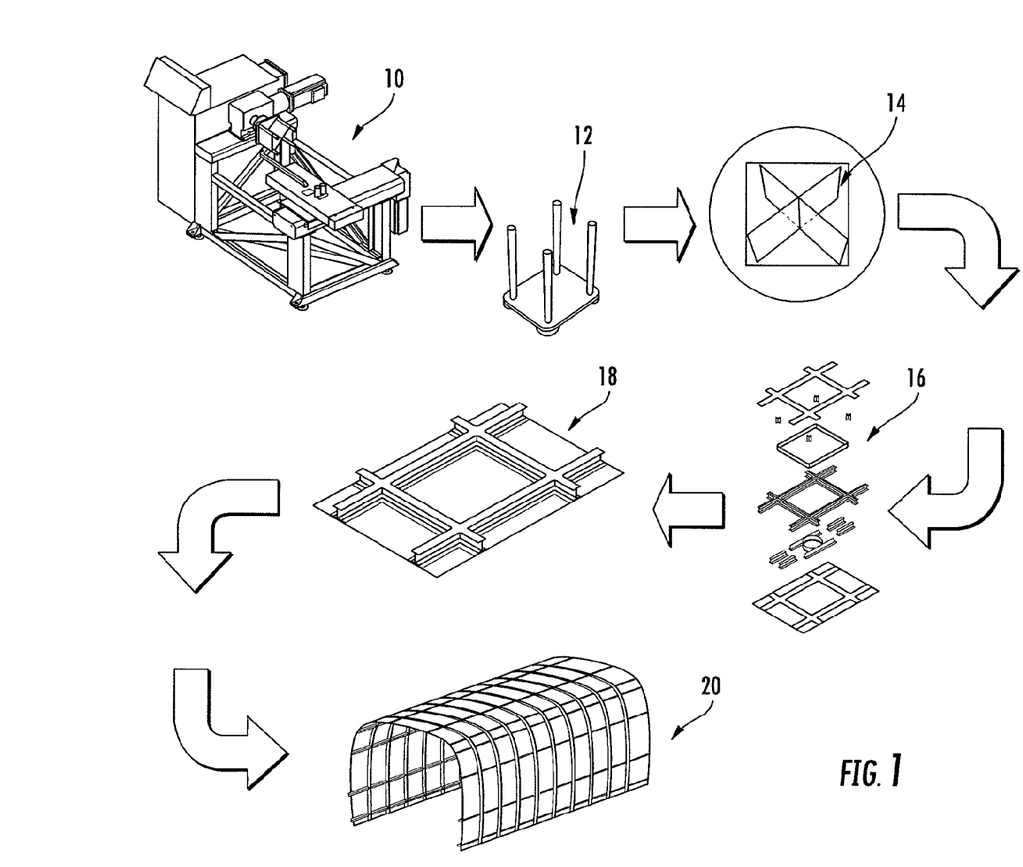
FIG. 1 is a flowchart illustrating various components of a system for manufacturing a composite reinforcement and integrating the composite reinforcement into a unitized structure, according to one embodiment of the present invention.

Referring now to the drawings and, in particular to FIG. 1, there is shown one embodiment of a system 10 for manufacturing a composite reinforcement 14 using a winding apparatus 12. The composite reinforcement 14 is capable of being integrated with various structural components 16 that may be assembled into a unitized structure 18 for forming a grid-stiffened structure 20. According to one aspect of the present invention, the composite reinforcement 14 is employed to integrate one or more aircraft components that may be collectively cured or otherwise assembled to form a unitized structure 18, which will be explained in further detail below.

It is understood that the composite reinforcement 14 could be used to transfer loads through and reinforce any number of structures in a variety of industries where unitization of the structure is required or desired, such as in the aircraft, automotive, or construction industries. Thus, the term "reinforcement" is not meant to be limiting, as the reinforcement could be any cruciform, structure, or the like that is used to reinforce any number of parts or structures of different shapes and sizes, such as adjoining structures. Furthermore, the composite reinforcement 14 could be assembled to structures comprising any number of composite and/or metallic materials. In addition, the term "preform" is not meant to be limiting as a preform could be any composite reinforcement that is subjected to subsequent processing. For instance, a composite reinforcement preform could be subjected to a curing process.

Figure 3:
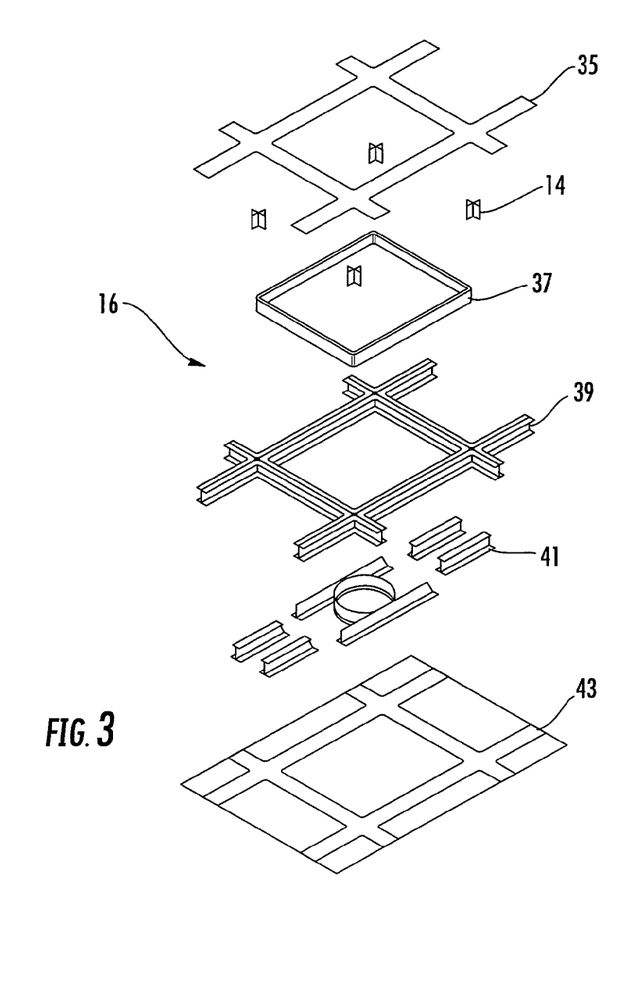
FIG. 3 depicts various structural components of FIG. 1 that may be unitized into a grid-stiffened structure.

With respect to the aircraft industry, for example, a plurality of reinforcements 14 could be employed to build up a grid-stiffened structure 20 including stiffeners, longerons, aircraft skin, and/or frames. One or more of the structural components could be a composite material. For example, FIG. 3 depicts various structural components 16 that may be integrated into a grid-stiffened structure 20. More specifically, the structural components 16 include a cap assembly 35, composite reinforcements 14, a web filler assembly 37, an intersecting frame longeron assembly 39, skin stiffeners 41, and an aircraft skin 43 that may be co-cured or assembled to form a unitized grid-stiffened structure 20. In order to assemble the structural components 16, a bonding assembly jig or tooling typically locates the composite reinforcement 14. The skin 43 is laid up, and the fabric or tape for the longerons 39 is wrapped around large rectangular mandrels. The web filler plies 37 and composite intersection 14 are then placed in between the mandrels, and cap plies 35 are added and the assembly is bagged for curing.

Figure 2:
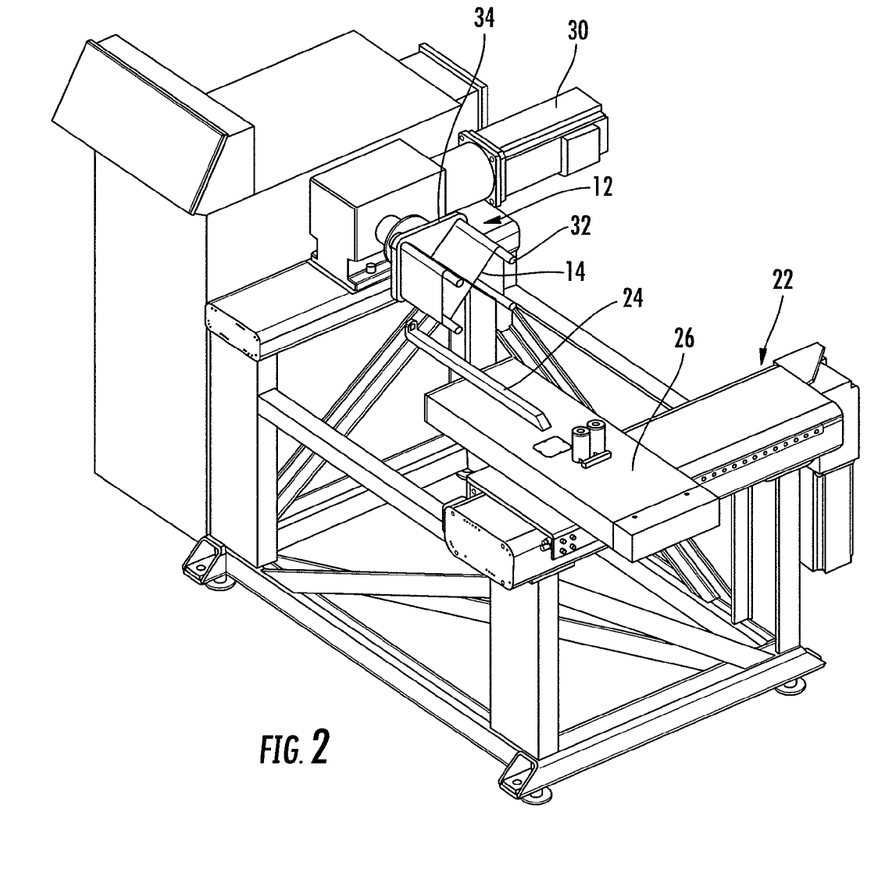
FIG. 2 is an enlarged perspective view of a system of FIG. 1 for forming a composite reinforcement.

FIG. 2 illustrates the system 10 shown in FIG. 1 in greater detail. In this regard, the system 10 generally includes a winding machine 22 for winding fiber about the winding apparatus 12. The winding machine 22 includes a winder 24, a translatable gantry 26, and a motor 30. More specifically the motor 30 mates with a base 32 of the winding apparatus 12 and is capable of rotating the winding apparatus 12 while the winder 24 pays out a continuous composite fiber about a plurality of pins 34 extending outwardly from the base to define a composite reinforcement 14. The translatable gantry 26 is capable of translating as the base 34 is rotated in order to wind the composite fiber about the winding apparatus 12. In particular, the composite fiber is unwound off of the winder 24 and about the outer pins 34 as the motor 30 rotates the winding apparatus 12 clockwise or counterclockwise. As the translatable gantry 26 translates, the composite fiber is unwound off of the winder 24 diagonally between pins 34 such that the combination of rotation and translation of the winder defines a composite reinforcement 14. However, as will be explained in further detail below, embodiments of the present invention provide various winding configurations for forming composite reinforcements 14.

It is understood that the system 10 may include various configurations such that the illustrated winding machine 22 is not meant to be limiting. Namely, any suitable winding machine 22 may be employed that is compatible with the winding apparatus 12 and capable of winding a continuous composite fiber thereabout. The winding machine 22 is typically capable of winding various composite materials about the winding apparatus 12, such as tow including graphite, Kevlar®, and glass materials, which may be dry or pre-impregnated with a suitable resin material (e.g., an epoxy or phenolic). According to one embodiment, the composite fiber is about ⅛ of an inch in width and 0.005 inches in thickness, although other sizes may be employed. The environment of the pre-impregnated material is typically monitored to ensure that the material properties are not adversely affected during manufacturing. For instance, the temperature and humidity of the composite fiber may be controlled as it is paid out from a creel, which affects the ability to handle the material (e.g., tackiness). Moreover, the winding machine 22 may be capable of varying the speed, thickness, tension, temperature, spacing, and axis orientation of the composite fiber in order to achieve a desirable strength and load carrying capacity. In particular, the winding machine 22 is capable of maintaining a constant tension of the continuous composite fiber when unwinding the composite fiber about the winding apparatus 12. Furthermore, the winding machine 22 is preferably automated such that the continuous composite fiber is wound in a predetermined configuration without user intervention, although the winding machine could be controlled manually if desired.

Figure 4A:
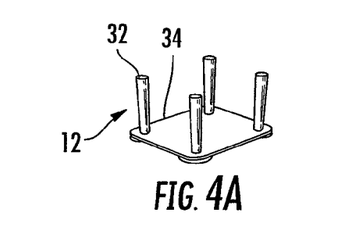
FIGS. 4A-4I illustrate exemplary steps for forming a composite reinforcement according to one embodiment of the present invention.

FIGS. 4A-4I illustrate various steps for forming a composite reinforcement 14 according to one embodiment of the present invention. FIG. 4A depicts a winding apparatus 12 that includes a plurality of pins 32 extending from a base 34. The base 34 is generally rectangular in configuration, while the pins 32 are each generally cylindrical. Although not shown, the base 34 is configured to be coupled with the motor 30 on the opposite surface of the pins 32, as described above, to provide for rotation of the base.

Figure 4B:
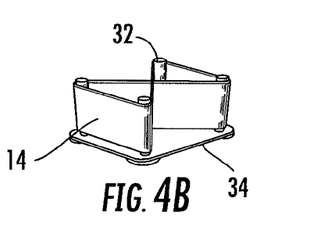
Figure 4C:
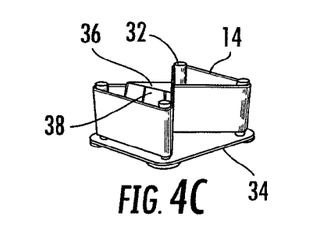
Figure 4D:
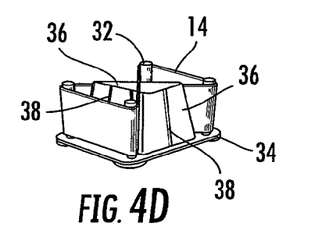
Figure 4E:
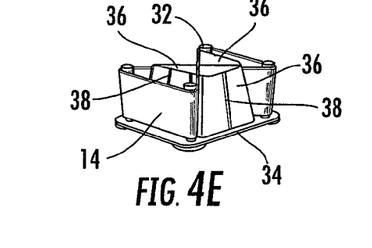
Figure 4F:
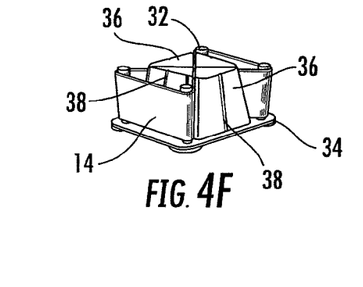
Figure 4G:
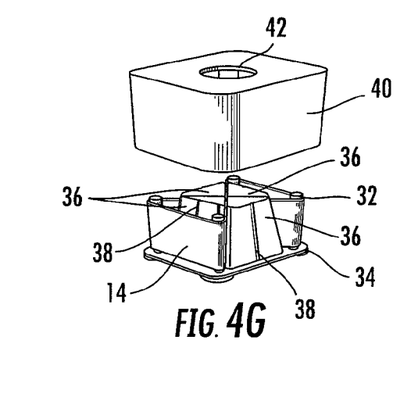
Figure 4H:
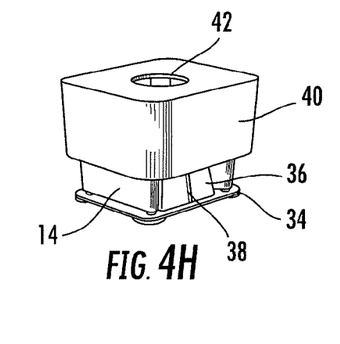
Figure 4I:
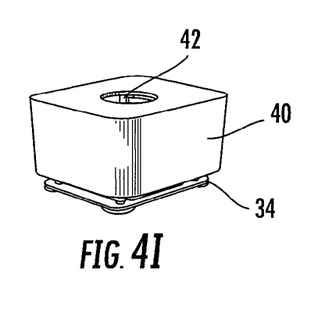

FIG. 4B depicts a composite reinforcement 14 preform that has been defined on the winding apparatus 12 by winding a continuous composite fiber about the pins 32. A continuous composite fiber is wound to define a composite reinforcement 14 preform having a pair of legs that intersect one another. In particular, the composite fiber extends diagonally between a first pair of pins 32, along the edge of the base 34 and about a third pin, and then diagonally between the third pin and a fourth pin such that the diagonals intersect one another to define a cruciform configuration. This pattern is repeated to define a composite reinforcement 14 having a figure eight pattern. FIG. 4C shows a mandrel 36 positioned adjacent to the base 34 and the intersection of diagonally extending portions of the composite reinforcement 14 preform. Moreover, FIGS. 4D-4F demonstrate that mandrel 36 is positioned adjacent to the base 34 and the intersection of the diagonally extending portions of the composite reinforcement 14 preform. Thus, each mandrel 36 occupies a respective quadrant defined by the intersection of the pair of legs of the composite reinforcement 14 preform. In the embodiment shown in FIGS. 4C-4F, each mandrel 36 generally includes a frustrum shape such that the collection of the mandrels defines a prismatic shape. The mandrels 36 are typically free standing such that that may be readily positioned adjacent to the base 34 and composite reinforcement 14 preform. The positioning of the mandrels 36 adjacent to the composite reinforcement 14 preform provides support thereto for a subsequent curing process.

Figure 8:
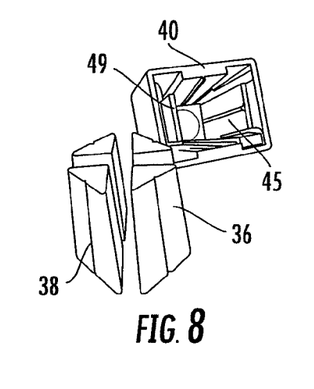
FIG. 8 depicts a cap and a plurality of mandrels that are compatible therewith according to another embodiment of the present invention.

Each mandrel 36 also includes a keyway 38 that extends along a backside of the mandrel (i.e., opposite from the intersection of the legs of the composite reinforcement 14). The keyway 38 is engagable with a key 45 defined within a cap 40. FIG. 8 shows a cap 40 having a key 45 that corresponds to each of the keyways 38 in the mandrels 36. Optionally, the cap 40 may include an opening 42 for aiding a technician in positioning the cap over the mandrels 36. The cap 40 includes an internal opening that is sized and configured to extend over and around the pins 32, composite reinforcement 14, and mandrels 36 and positioned on the base 34. In particular, FIG. 8 shows that the cap 40 includes walls 49 that have a respective key 45 defined thereon. The walls 49 are configured to align with a respective mandrel 36. Moreover, a pair of walls 49 are spaced away from the outer edges of the cap to facilitate the positioning of the cap over the portions of the composite reinforcement 14 extending non-diagonally between the pins 32.

As the cap 40 is positioned on the base 34, each key 45 defined in the cap 40 engages a respective keyway 38 defined in the mandrels. Furthermore, the backside of each mandrel 36 may include a tapered surface (e.g., 5° from vertical) such that the mandrels are broader at their base. One or more of the walls 49 may also include respective tapered surfaces that are configured to align with the tapered surfaces of each mandrel 36. Tapering the surfaces of the mandrel 36 and walls 49 facilitate alignment of the cap on the mandrel when positioning the cap thereon and provide a tight fit adjacent to the composite reinforcement 14 for reducing the incidence of movement by the mandrels during curing. Thus, the mandrels 36 and cap 40 collectively support the composite reinforcement 14 during a curing process.

Figure 6A:
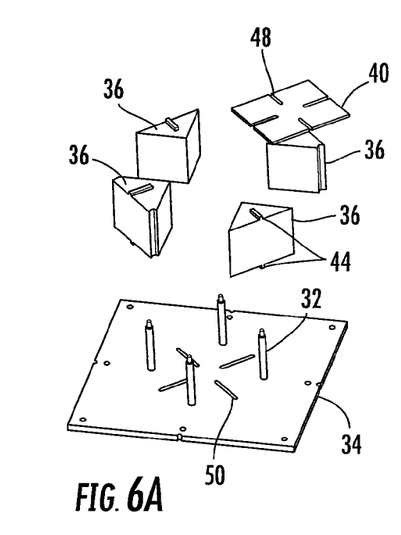
FIGS. 6A-6B illustrate various components for forming a composite reinforcement according to another embodiment of the present invention.
Figure 6B:
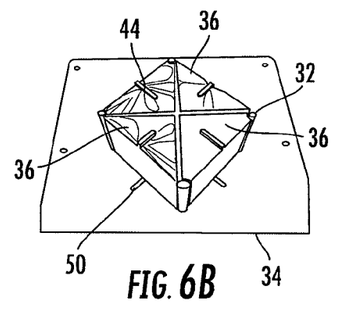
Figure 7:
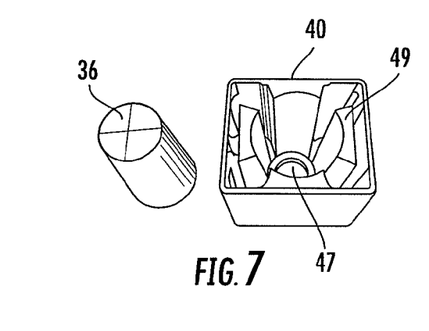
FIG. 7 shows a cap and a plurality of mandrels that are compatible therewith according to one embodiment of the present invention.

It is understood that the configuration of the winding apparatus 12 and mandrels 36 shown in FIGS. 4A-4I are not meant to be limiting as each may be various sizes and configurations in additional aspects of the present invention. Thus, it is understood that the pins 32 and base 34 may be various sizes and configurations and still be capable of having a composite fiber wound thereabout. However, the pins 32 are of sufficient length to enable a composite fiber to be wound about the pins a plurality of times to define a composite reinforcement 14. For instance, the base 34 could be round, and the pins 32 could have a rectangular cross section. There could also be any number of pins 32 extending from the base 34, such as six, to achieve a desired composite reinforcement 14 configuration. Furthermore, the mandrels 36 may be various configurations that reduce or eliminate movement of the mandrels during curing, which often leads to loss of straightness of the composite fiber. For instance, the mandrels 36 could be semi-circular as shown in FIG. 7. Consequently, the cap 40 may be various configurations in order to be compatible with the mandrels 36, such as a cap having a conical opening 47 for accommodating a plurality of semi-circular mandrels as illustrated in FIG. 7. In addition, the mandrels 36 may have a key defined thereon rather than a keyway that is engagable with a keyway defined within the cap 40. Furthermore, FIGS. 6A-6B demonstrate that the mandrels 36 may have a key 44 defined on its upper and lower surfaces such that each key engages a keyway 48 defined in the cap 40 and a keyway 50 defined in the base 34. Additionally, the cap 40 shown in FIGS. 6A-6B is not configured to enclose the composite reinforcement 14, but is rather configured to be positioned adjacent to a surface of each mandrel opposite the base 34 and engage each of the keys 44 with keyways 48.

In effect, the composite reinforcement 14 is a preform following winding of a continuous composite fiber with the winding apparatus 12, as the composite reinforcement undergoes subsequent processing in order to take on a finalized form for integration with various structural components. In this regard, the composite reinforcement 14 may be partially cured such that only a portion of the composite reinforcement is cured and acquires a sufficient rigidity for subsequent handling. The partially cured composite reinforcement may then be co-cured to various structural components. Alternatively, the composite reinforcement 14 may be fully cured such that the entire composite reinforcement is cured and subsequently assembled to structural components using various techniques, such as mechanical fastening. Various techniques known to those skilled in the art could be employed to co-cure or co-bond the composite reinforcement 14, such as an autoclave, a press, or oven. When the composite reinforcement 14 is partially or fully cured, the cap 40 may be readily removed from the base 34 and mandrels 36. The mandrels 36 may then be removed and the composite reinforcement cut to a desired shape (e.g., a cruciform) and prepared for bonding and assembly with various structural components. Furthermore, additional layers of material, such as a composite tape, pre-impregnated fabric, or cloth material may be applied to the composite reinforcement 14 prior to co-bonding or co-curing to achieve a desired strength and load carrying capacity.

Figure 5:
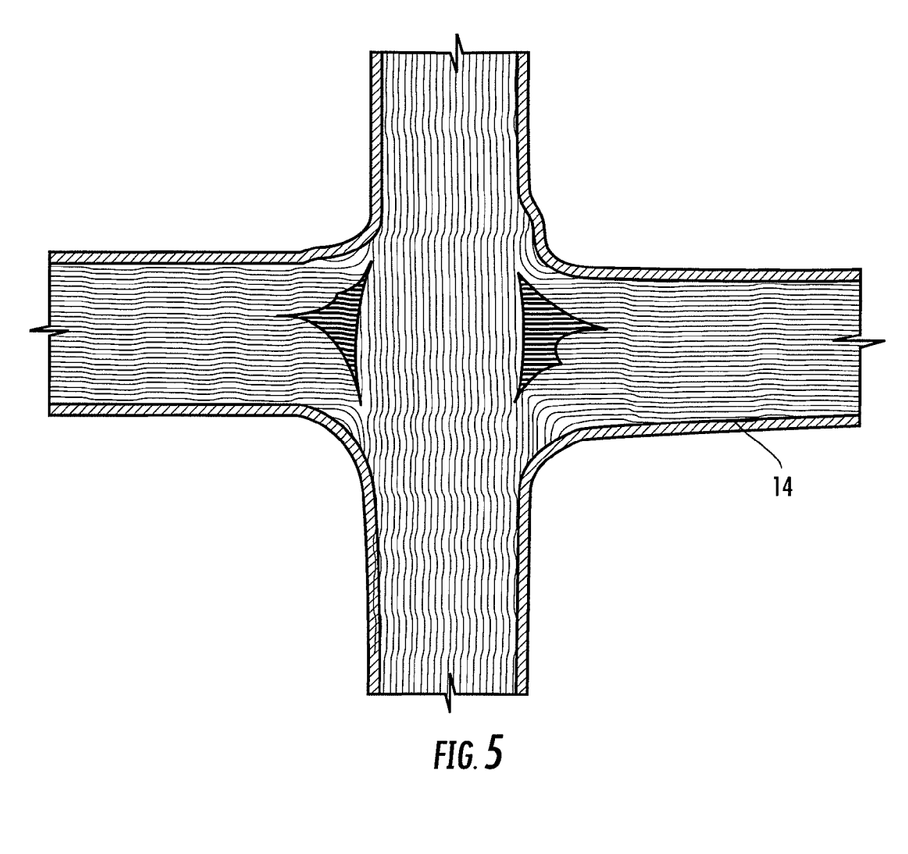
FIG. 5 is a cross section of an intersection of a composite reinforcement according to one embodiment of the present invention.

FIG. 5 illustrates a cross section of a composite reinforcement 14 according to one embodiment of the present invention. As shown, the composite reinforcement includes unidirectional fibers and a pair of legs that intersect one another. Thus, the composite reinforcement 14 includes a cruciform cross section. FIG. 5 also demonstrates that the composite reinforcement 14 may include one or more additional layers of material, such as a composite tape or cloth material. In order to achieve the cruciform configuration, the composite reinforcement 14 is typically cut and sanded following curing. For instance, the composite reinforcement 14 shown in FIGS. 4A-4I comprises a figure eight pattern after curing such that the portions of the wound composite fibers extending along the backside of a pair of opposed mandrels 36 (i.e., non-diagonally extending portions) would be cut between adjacent pins 32. Because the composite reinforcement 14 is not cut into a desired shape until after curing, the tension in the continuous composite fiber is maintained until after curing, which reduces distortion of the composite reinforcement.

It is understood the composite reinforcement 14 may comprise various configurations. For example, the composite reinforcement 14 may be wound to include a plurality of legs and one or more intersections such that the number of structures that can be assembled to the composite reinforcement can be varied. For instance, the composite reinforcement 14 can include three legs and two intersections resulting from winding a continuous carbon fiber in a predetermined pattern. In addition, the composite reinforcement 14 is capable of having a plurality of layers of composite fibers. In particular, as a continuous carbon fiber is wound diagonally between pins 32, the base may be indexed (i.e., rotated) such that the composite fiber travels between pins and then again diagonally in an overlying relationship to a previously wound composite fiber. Thus, the composite reinforcement 14 may include one or more layers of continuous composite fiber to vary the thickness and, hence, the strength and load carrying capacity of the composite reinforcement.

Thus, embodiments of the present invention may provide several advantages. For example, a composite reinforcement may be manufactured that is capable of being co-cured or otherwise assembled with a plurality of structures to form a unitized grid-stiffened structure. Thus, the composite reinforcement may be capable of transferring loads longitudinally and transversely through intersections of the composite reinforcements and structural components assembled thereto. Moreover, embodiments of the present invention may reduce the costs and time required to assemble a unitized grid-stiffened structure that is lighter in weight than conventional structures. Furthermore, aspects of the present invention may facilitate the manufacture of composite reinforcements having customized strength and load carrying capacity. The configuration of the mandrels and cap may reduce or eliminate the incidence of movement of the mandrels during curing, which reduces the loss of straightness of the composite fibers.

Many modifications and other embodiments of the invention set forth herein will come to mind to one skilled in the art to which the invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An assembly for manufacturing a composite reinforcement for unitizing a structure, the assembly comprising:
 a base comprising a plurality of pins extending outwardly therefrom to define a structure about which a composite fiber is wound to define a composite reinforcement preform;
 a plurality of mandrels positioned adjacent to the base and at least a portion of the composite reinforcement preform, at least one mandrel comprising a tapered surface; and
 a cap positioned over at least a portion of the plurality of mandrels, wherein the cap is configured to engage each of the mandrels including the tapered surface of at least one mandrel to support the mandrels and the composite reinforcement preform during a curing process to form the composite reinforcement.

2. The assembly according to claim 1, wherein the base comprises four pins.

3. The assembly according to claim 1, wherein the pins are positioned such that the composite fiber is wound about the plurality of pins in a figure eight pattern.

4. The assembly according to claim 1, wherein each mandrel comprises a frustum shape, and wherein the plurality of mandrels are positioned on the base to collectively define a prismatic shape.

5. The assembly according to claim 1, wherein each mandrel comprises a key or a keyway that is configured to mate with a respective keyway or key in the cap.

6. The assembly according to claim 1, wherein each mandrel comprises a tapered surface extending along a backside of the mandrel.

7. The assembly according to claim 6, wherein the cap comprises a tapered surface that corresponds with each of the tapered surfaces on a respective mandrel.

8. The assembly according to claim 1, wherein the cap is configured to be positioned over the plurality of pins and mandrels and positioned adjacent to the base.

9. The assembly according to claim 1, wherein the cap is configured to be positioned adjacent to a portion of the plurality of mandrels about the base.

10. The assembly according to claim 1, wherein the cap defines an opening positioned to allow a technician to view a positioning of the cap with respect to the plurality of mandrels.

11. The assembly according to claim 1, wherein the base is selected from a shape of substantially rectangular, substantially circular, or substantially square.

12. The assembly according to claim 1, wherein the pins are substantially circular.

13. The assembly according to claim 1, wherein the plurality of pins comprises at least four pins.

14. The assembly according to claim 1 further comprising a plurality of legs formed of the continuous composite fiber and having at least one intersection, wherein the legs are comprised of a plurality of unidirectional layers positioned one on top of the other, and wherein at least a portion of at least one leg is secured to the at least one structural component to form a unitized grid-stiffened aircraft structure.

15. An assembly for manufacturing a composite reinforcement comprising:
 a base comprising a plurality of pins extending outwardly from the base to define a structure about which a composite fiber is wound to define a composite reinforcement preform;
 a plurality of mandrels positioned proximate the base and at least a portion of the composite fibers, the plurality of mandrels defining a prismatic shape; and
 a cap positioned over at least a portion of the plurality of mandrels, wherein the cap is configured to engage a prismatic surface defined by the plurality of mandrels, the cap configured to support the plurality of mandrels so as to reinforce the and the composite reinforcement preform during a curing process.

16. The assembly of claim 15 further comprising the composite fiber wound around the plurality of pins, the composite fiber defining a cruciform cross section.

17. The assembly of claim 15, wherein the cap engages the plurality of mandrels in a key and keyway engagement.

18. The assembly of claim 17, wherein at least one key is disposed on the cap.

19. The assembly of claim 17, wherein at least one key is disposed on at least one mandrel.

20. An assembly comprising:
 a base;
 a plurality of pins extending outwardly from the base to define a structure;
 a composite fiber wound around the plurality of pins to define a composite reinforcement preform;
 a plurality of mandrels positioned proximate the base and at least a portion of the composite reinforcement preform; and
 a cap positioned over at least a portion of the plurality of mandrels, wherein the cap is configured to engage the mandrels in a key and keyway engagement to support the mandrels and the composite reinforcement preform during a curing process to form a composite reinforcement.

* * * * *